Dec. 23, 1958

H. G. KLASSEN 2,865,979

EXTENSIBLE CABLE STRUCTURE

Filed Oct. 14, 1955

INVENTOR
HARRY G. KLASSEN

BY *Emery Robinson*

ATTORNEY

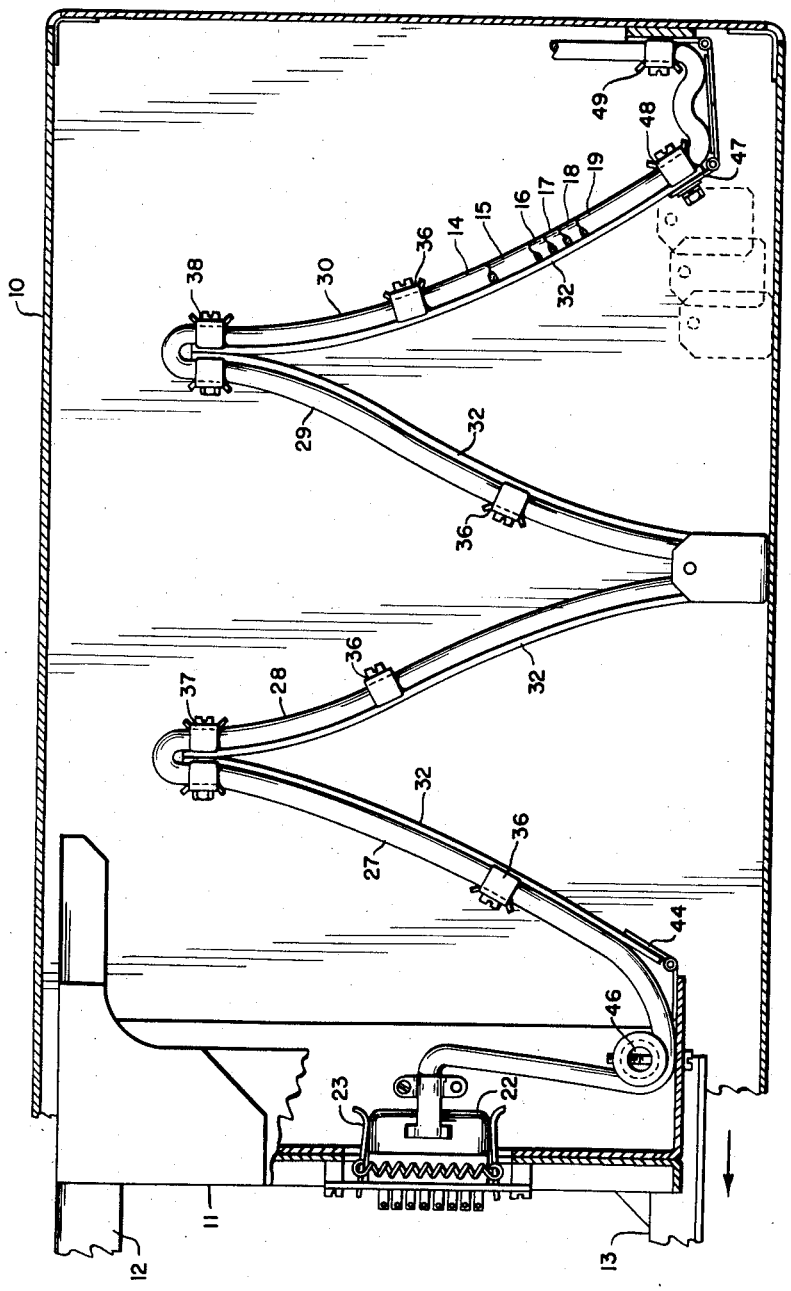

United States Patent Office 2,865,979
Patented Dec. 23, 1958

2,865,979

EXTENSIBLE CABLE STRUCTURE

Harry G. Klassen, Evanston, Ill., assignor to Teletype Corporation, Chicago, Ill., a corporation of Delaware Application October 14, 1955, Serial No. 540,494

6 Claims. (Cl. 174—69)

This invention relates to extensible cable structure and more particularly to a cable structure having pleated sections capable of longitudinal movement with vertical stability.

Many component units of electrical equipment are mounted on movable racks or drawers so that the components may be normally maintained within a cabinet during normal operation and withdrawn from the cabinet during periods in which it is desired to test, inspect or service the component units. Normally, connections with a source of power and/or with other component units must be maintained during the period in which testing, inspecting and servicing operations are being performed. Difficulties are encountered in the tangling of the interconnecting cables during withdrawal and replacement of the racks in the cabinet. When many cables are utilized and many racks are located in close proximity with each other, then the problem of ensnarling of adjacent cables becomes increasingly acute to obstruct the proper functioning of the individual racks.

In order to preclude tangling and insure the proper position of the conducting connectors, cables have been produced wherein the cable covering is formed as coils with the insulation being preset to cause the conductors to always restore to a fixed coiled position. However, where racks of any narrow, elongated, rectangular shape are used, the coils are so large that they become entangled with the coils of the cables attached to the adjacent racks. Further, with the use of coiled cables, the spirals take up considerable area hence necessitating wide spacing between the units connected to the coiled cables.

Pleated construction of the cable is possible but disadvantages have been encountered such as undue stress concentration at the joints, lack of vertical stability during extension and contraction of the pleated sections, etc.

A primary object of the present invention is to provide a cable construction that permits extension and contraction of the cable without undue stress being encountered in any section.

Commensurate with the first object, it is a further object of the invention to provide a pleated cable that may be extended and contracted a great number of times without any failure due to fatigue.

Another object of the invention resides in a pleated cable that may be extended and withdrawn in a horizontal plane without the pleated sections tilting from the plane of movement.

An additional object of the invention is to provide a pleated cable that upon extension thereof, a portion of the cable moves into engagement with a support to insure stability of the cable against lateral movement.

A still further object of the invention resides in a simple economical extensible cable construction which permits mounting of several cables in close proximity to each other without any danger of entanglement of adjacent cables.

With these and other objects in view the present invention contemplates a cable structure wherein the cable is attached to a plurality of resilient members having a relatively high coefficient of restitution. The cable is folded like an accordion and each resilient member forms a pleat. Suitable clamping means are attached to the cable to secure the ends of each pair of resilient members together. One end of the cable is secured to a fixed structure, such as a cabinet, and the other end is secured to a movable structure such as a drawer or a rack. As the drawer is moved in and out of the cabinet flexing will take place along the entire length of the resilient member, thus precluding undue stress concentration at any point in the cable.

Other objects and advantages of the present invention will be apparent from the following detailed description when considered in conjunction with the accompanying drawings wherein:

Fig. 2 is another side elevational view partially in section, illustrating the cable shown in Fig. 1 in an extended position.

Figure 1:
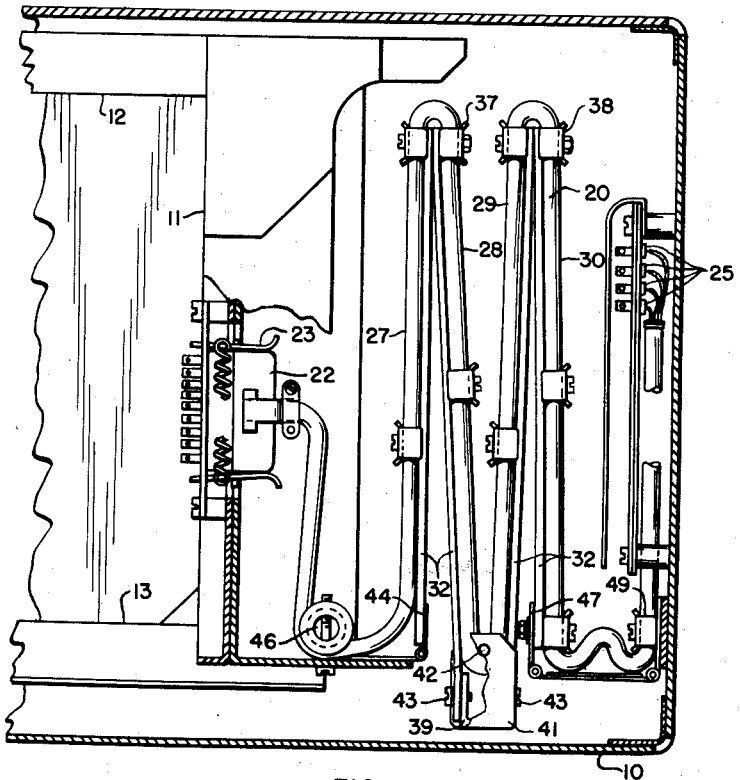
Fig. 1 is a side elevational view showing a portion of a cabinet having mounted therein a pleated cable embodying the principal features of the present invention.

Referring to Figs. 1 and 2 there is shown a portion of a cabinet 10 having movably mounted therein a rack or drawer 11. This drawer is adapted to ride on guide rails 12 and 13. Mounted on the drawer are a plurality of electrical components (not shown), the particular types of components being unimportant but functioning with other components located within the cabinet or on other drawers. Each of these electrical components may be interconnected to form the electrical equipment of a single installation.

Components on the drawer 11 are connected to the components within the cabinet 10 by means of a cable consisting of a number of individually insulated conductors designated by the reference numerals 14 to 19, inclusive. One end of each conductor is secured to a plug 22, having a plurality of prongs attached thereto and adapted to be seated within sockets formed in the end of the drawer. A spring biased clamp 23 is provided to hold the plug in position during periods in which pulling tension is exerted on the conductors. The other ends of the conductors 14 to 19 terminate in soldered electrical connections on a bank of electrical terminals 25 attached to cabinet 10.

It will be noted that upon inspection of Figs. 1 and 2, that the cable is folded to provide a plurality of pleated sections 27, 28, 29 and 30. Each pleated section is secured to a resilient backing on supporting member 32. This backing member may be constructed of Nylon, moderately stiff rubber or other resilient materials. At least one intermediate clamp 36 is provided to hold the conductors in close proximity to each backing member 32. These clamps 36 may be spaced from the insulated conductors to permit sliding of the conductors along the backing members 32 while the cable is being extended or contracted thereby eliminating any undue stress between the clamps and conductors.

The upper terminus of each pleated section of cable is firmly secured to its adjacent section by screw adjustable clamps 37 and 38. The lower ends of the pleated sections 28 and 29 are secured together by a clamping device consisting of a U-shaped frame 39 (see Fig. 1) having side pieces 41. Conductors are passed within this clamping device and are retained therein by means of a pin 42 passing through the side pieces. Screws 43 are provided to hold backing members to a U-shaped frame 39.

The left-hand backing member 32 is secured to a spring like member 44. The conductors of pleated section 27 pass beneath a clamping flanged roller 46 to the plug 22. The right-hand backing member is attached to a hinge 47 having also secured thereto conductors 14 to 19 by means of a clamp 48. The conductors run from the hinge past a second clamp 49 which functions to anchor the conductors to the cabinet prior to passing to the electrical terminals 25.

It may be therefore comprehended that a cable structure is fashioned wherein the withdrawal of the drawer 11 will extend the cable by flexing said cable along the flexible backing members 32. The cable is shown in the extended position in Fig. 2 and it will be noted that each backing member is bent in an arcuate configuration; and no sharp angle bends exist in the conductors. With the cable extended as shown in Fig. 2 all bending stresses are distributed over the large areas of the backing member thereby precluding the possibility of bending stress failure in the individual conductors.

It is possible to more evenly distribute bending stress by increasing the thickness of the backing members wherever excessive bending is noted. In the optimum condition each of the backing members would describe a nearly perfect arc and the stress would be uniformly distributed over the entire length of the backing members.

Looking at Fig. 2 the position of the U-shaped frame 43 is shown in the several positions it assumes during extension of the cable. It will be noted that as the drawer is withdrawn, the U-shaped frame 43 rapidly moves downwardly into engagement with the floor of the cabinet 10 and thereafter moves along the floor. This peculiarity is attributable to the location of the roller clamp 46 and the hinge clamp 48 which are both below the center line of the folded cable. As the cable is extended the horizontal center line of the pleated sections move towards the source of tension tending to extend the cable. The source of tension is located in the sections of cable located beneath the roller 46 and in the sections of cable beneath the clamp 48. The tensile force on the cable located beneath the clamp 48 is in reality a reactive force which opposes the extension of the cable.

Inasmuch as the undersurface of the U-shaped frame is flat, this undersurface will function as a guide to preclude lateral movement of the clamp during a major portion of the time the drawer is being withdrawn. Stability against lateral movement is also attained by the inherent structure of the backing members 32 which are flat and hence tend to resist twisting movements.

Figure 3:
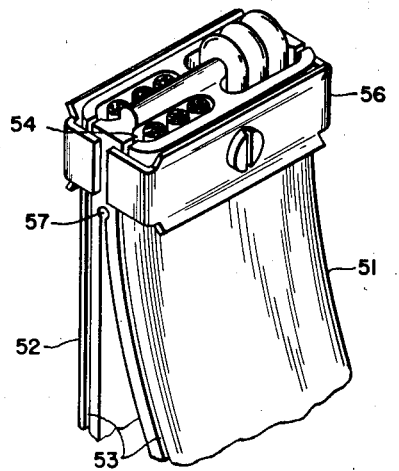
Figs. 3, 4, and 5 show alternative constructions of cables that may be used in the present invention.

In Fig. 3 there is shown a modified construction of the backing or supporting member. In this instance backing members 51 and 52 are preformed as a unit in a mold. Each side edge of the backing members has slot 53 formed therein leading to an elongated cavity 54 into which any number of electrical conductors may be placed. A clamp 56 is fastened in the vicinity of the top of the molded backing members 51 and 52. This clamp serves a dual purpose in that the conductors are held in place and secondly the slots 53 are held in position to preclude withdrawal of the conductors. In order to prevent excessive stress concentration at the junction of the two backing members a stress relieving cylindrical flute 57 is formed therein.

Figure 4:
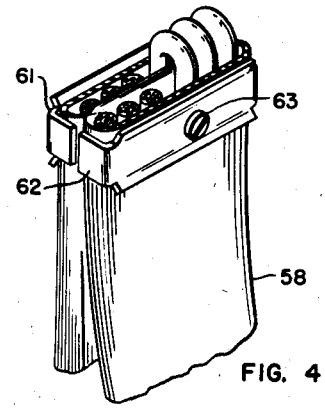

Attention is directed to Fig. 4 where a still further embodiment of the invention is illustrated. In this embodiment a backing member 58 for the conductors is extruded as a flat hollow casing into which the individual conductors may be placed side by side. The assembled conductors and casing are then folded into pleats and the rounded extremity of each pleated section of the casing is severed to expose conductors. Thereafter the ends of each pleated section are clamped by means of a pair of U-shaped brackets 61 and 62, fastened together by a screw 63. The severing of the casing relieves undue stress concentration in the outer walls of each pleated section.

Figure 5:

It is also possible to form the casing and insulated conductors into one compact integral unit such as depicted in Fig. 5. In this embodiment the pleated cable construction may be obtained by forming and clamping the pleated sections in the same manner as discussed with regard to the embodiment of the invention shown in Fig. 4.

It is to be understood that the above-described arrangement of components and construction of elemental parts are simply illustrative of several applications of the principles of the invention and many other modifications may be made without departing from the invention.

What is claimed is:

1. An extensible cable structure which comprises an elongated electrical conductor arranged in a folded, zig-zag pattern and having courses normally in substantially-parallel planes with each course having at least one end terminating in a semicircular end portion, clamps for holding the bent portions against flexure, and a flexible member associated with each course, the ends of the member associated with each course, the ends of the flexible members being fixed to the clamps with the portions of the members between the ends flexing when the courses are moved out of their parallel planes.

2. An extensible cable structure which comprises a plurality of electrical wires forming a cable and arranged in a folded, zig-zag pattern defining a plurality of courses with a curved portion adjacent to the end of each course, an elongated flexible member associated with each course, and a plurality of clamps, each of the clamps securing an associated one of the curved portions against flexure and against relative movement with respect to the end portions of adjacent flexible members and without preventing flexure of the body portions of the members upon extension and contraction of the cable structure.

3. An extensible cable structure for connecting a cable between a cabinet and electrical apparatus secured to a movable drawer in the cabinet such that the cable can be extended without entangling it or applying undue stress to it, which comprises an electrical connector secured to the cabinet, an electrical connector secured to the drawer, means for connecting a first end of the cable to the connector on the cabinet, means for connecting the second end of the cable to the connector on the drawer, the cable being arranged in a folded, zig-zag pattern and having courses in substantially parallel planes when the drawer is closed with the portions of the cable adjacent to the ends of the courses being curved, a plurality of elongated, flat, flexible members, each of the flexible members supporting an associated one of the courses, and a plurality of clamps holding the curved portions of the cable against flexure and the end portions of the flexible members against relative movement with respect to the curved portions of the cable, the courses moving out of their parallel plane and the body portions of the flexible members between the clamped end portions flexing upon extension of the cable by opening the drawer.

4. An extensible cable structure which comprises a plurality of electrical wires arranged in parallel relationship and in a folded, zig-zag pattern, thereby defining a plurality of courses with a curved portion adjacent to the end of each course, a plurality of elongated hollow, resilient supporting members, one of the hollow supporting members being associated with each of the courses and with the wires defining the courses passing through the interior thereof, and a plurality of clamps, each one of the clamps securing an associated one of the curved portions of the wires against flexure and against relative movement with respect to the end portions of the supporting members while permitting flexure of the body portions of the supporting members upon extension and contraction of the cable structure.

5. An extensible cable structure which comprises a plurality of electrical conductors arranged in parallel relationship and in a folded, zig-zag pattern to define a plurality of courses with a curved portion adjacent to the end of each course, a plurality of flat, resilient supporting members, each of the flat supporting members being positioned adjacent to one of the courses, and a plurality of clamps, each of the clamps securing an associated one of the curved portions of the conductors against flexure and against relative movement with respect to the end portions of the supporting members while permitting flexure of the body portions of the supporting members upon extension and contraction of the cable structure.

6. Apparatus for extending an electrical cable of the type including a plurality of electrical conductors which are arranged in a folded, zig-zag pattern to define a plurality of courses with a curved portion adjacent to the end of each course, which comprises a plurality of resilient supporting members, each of the supporting members being positioned adjacent to one of the courses, and a plurality of clamps, each of the clamps securing one of the curved portions of the conductors to the ends of supporting members associated with adjacent courses such that flexure of the curved portions of the conductor and relative movement of the curved portions with respect to the end portions of the supporting members are prevented while flexure of the body portions of the supporting members is permitted upon extension of the cable structure.

References Cited in the file of this patent

UNITED STATES PATENTS

| | | |
|---|---|---|
| 1,369,998 | Wolter | Mar. 1, 1921 |
| 1,962,464 | Richsteig | June 12, 1934 |
| 2,144,872 | Cruser | Jan. 24, 1939 |
| 2,446,907 | Cavanagh | Aug. 10, 1948 |
| 2,486,764 | Singer | Nov. 1, 1949 |
| 2,647,160 | Hood | July 28, 1953 |

FOREIGN PATENTS

| | | |
|---|---|---|
| 103,556 | Switzerland | Nov. 23, 1922 |
| 957,411 | France | Aug. 22, 1949 |